United States Patent
Sharon et al.

(10) Patent No.: US 11,830,049 B2
(45) Date of Patent: Nov. 28, 2023

(54) CROSS-SERVICE TRANSACTION FACILITATION AND DYNAMIC TRANSACTION INTERFACES

(71) Applicants: Meidad Sharon, Ramat Gan (IL); Ben Eisenthal, Ramat Gan (IL); Eran Manor, Ramat Gan (IL)

(72) Inventors: Meidad Sharon, Ramat Gan (IL); Ben Eisenthal, Ramat Gan (IL); Eran Manor, Ramat Gan (IL)

(73) Assignee: ChargeAfter, Ltd., Tel Aviv (IL)

( * ) Notice: Subject to any disclaimer, the term of this patent is extended or adjusted under 35 U.S.C. 154(b) by 0 days.

(21) Appl. No.: 17/259,382

(22) PCT Filed: Jul. 11, 2019

(86) PCT No.: PCT/US2019/041501
§ 371 (c)(1),
(2) Date: Jan. 11, 2021

(87) PCT Pub. No.: WO2020/251598
PCT Pub. Date: Dec. 17, 2020

(65) Prior Publication Data
US 2021/0279781 A1 Sep. 9, 2021

Related U.S. Application Data

(60) Provisional application No. 62/696,339, filed on Jul. 11, 2018.

(51) Int. Cl.
*G06Q 30/06* (2023.01)
*G06Q 40/03* (2023.01)

(52) U.S. Cl.
CPC ............ *G06Q 30/06* (2013.01); *G06Q 40/03* (2023.01)

(58) Field of Classification Search
CPC .... G06Q 30/06; G06Q 30/0611; G06Q 40/25; G06Q 40/02; G06Q 10/101
(Continued)

(56) References Cited

U.S. PATENT DOCUMENTS 6,662,199 B1 * 12/2003 Flight .................... G06Q 10/06
707/999.1
9,836,462 B2 * 12/2017 Shukla .................... G06F 16/93
(Continued)

FOREIGN PATENT DOCUMENTS

CN 101364331 A * 2/2009 ............. G06Q 30/06
KR 101076650 B1 * 10/2011 ............. G06Q 30/06

OTHER PUBLICATIONS

Kanwar, Shimona; "UT keen to fund e-shopping [Chandigarh]"; The Times of India [New Delhi] Aug. 8, 2009, retrieved from Dialog database on Aug. 9, 2022 (Year: 2009).*

*Primary Examiner* — Yogesh C Garg
(74) *Attorney, Agent, or Firm* — Bochner PLLC; Ariel Reinitz

(57) ABSTRACT

Technologies are disclosed for cross-service transaction facilitation and dynamic interfaces. A notification of a first transaction associated with a first user is received from a first service. Second service(s) configured to facilitate execution of the first transaction are identified and execution projections are computed with respect to the second service(s). A first interface is generated based on the identified second service(s) and the projections. First input(s) are received with respect to the first interface and a second interface is generated based on the first input(s), second service(s), and projection(s). Second input(s) are received with respect to the second interface and facilitation request(s) are initiated based on the inputs. Response(s) to the request(s) are received from the second service(s). An execution selection is generated based on the received response(s). An execution (Continued)

selection response is received and action(s) are initiated with respect to the first transaction based on the response.

20 Claims, 6 Drawing Sheets

(58) Field of Classification Search
USPC ........................................................ 705/26.4
See application file for complete search history.

(56) References Cited

U.S. PATENT DOCUMENTS

| | | |
|---|---|---|
| 10,846,106 B1 | 11/2020 | Curic et al. |
| 11,409,546 B2 | 8/2022 | Barrett et al. |
| 11,496,293 B2 | 11/2022 | Yee et al. |
| 2004/0167828 A1* | 8/2004 | Bria, Jr. ............. G06Q 30/0613 705/26.1 |
| 2008/0177648 A1* | 7/2008 | Doyle .................... G06Q 30/06 705/1.1 |
| 2013/0191213 A1* | 7/2013 | Beck .................. G06Q 30/0207 705/14.64 |
| 2014/0372234 A1* | 12/2014 | Tikku .................... G06Q 20/027 705/21 |
| 2022/0366264 A1 | 11/2022 | Moradi et al. |

* cited by examiner

CROSS-SERVICE TRANSACTION FACILITATION AND DYNAMIC TRANSACTION INTERFACES

CROSS-REFERENCE TO RELATED APPLICATION

This application is related to and claims the benefit of priority to U.S. Patent Application No. 62/696,339 filed Jul. 11, 2018 which is incorporated herein by reference in its entirety.

TECHNICAL FIELD

Aspects and implementations of the present disclosure relate to data processing and, more specifically, but without limitation, to cross-service transaction facilitation and dynamic transaction interfaces.

BACKGROUND

Using electronic devices (mobile devices, PCs, etc.), users can interact with various services to initiate transactions and/or perform various operations.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to cross-service transaction facilitation and dynamic transaction interfaces.

Utilizing devices such as smartphone, PCs, or other connected devices, users can interact with various external services. Such interactions can include initiating various communications, operations, and/or transactions with such services. While a user may initiate operations or transactions with respect to one service, in certain scenarios such a service may not provide certain features, functionalities, and/or capabilities which may be advantageous or desirable to the user. In such scenarios, the user may be unwilling or unable to complete an operation or transaction, on account of the lack of features, functionalities, and/or capabilities provided by the service.

Accordingly, described herein in various implementations are technologies, including methods, machine readable mediums, and systems, that enable cross-service transaction facilitation and dynamic transaction interfaces. The described technologies enable users and services (with respect to which such users wish to initiate operations, transactions, etc.) to further integrate and leverage the features, functionalities, and/or capabilities provided by other service(s) (e.g., third party services). In doing so, operations and transaction that may otherwise not have been completed can be executed. Additionally, as described herein, the described technologies can utilize machine learning, artificial intelligence ("AI"), and other techniques to dynamically adjust interface(s) through which a user/device interacts. In doing so, the integration of multiple services can be enabled while maintaining a unified, streamlined user experience. Such dynamic interfaces can also increase engagement and improve performance of the system, as described herein.

It can therefore be appreciated that the described technologies are directed to and address specific technical challenges and longstanding deficiencies in multiple technical areas, including but not limited to cross-service transactions, user interfaces, and artificial intelligence. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

Figure 1:
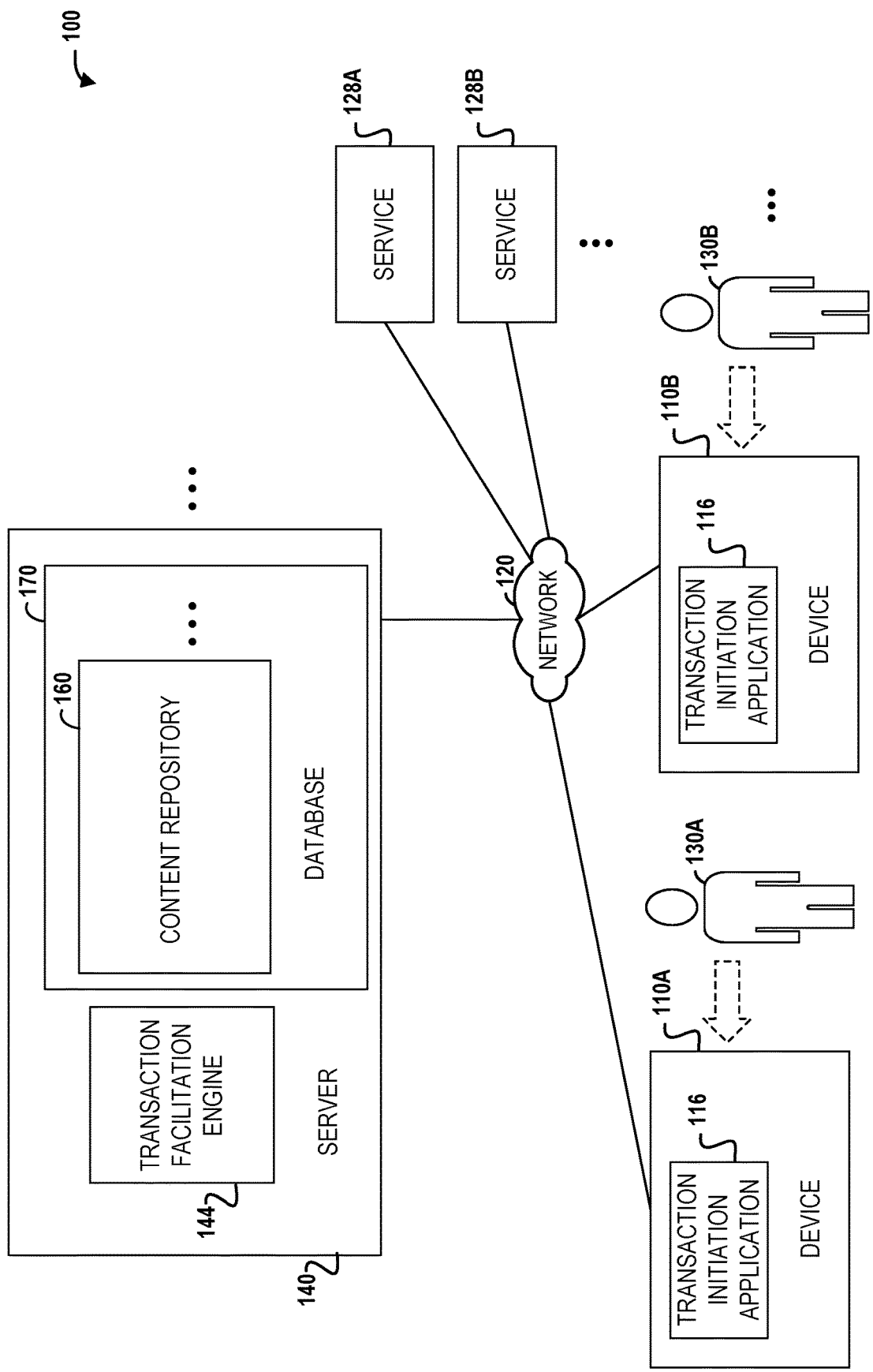
FIG. 1 illustrates an example system, in accordance with an example embodiment.

FIG. 1 illustrates an example system 100, in accordance with some implementations. As shown, the system 100 includes devices such as device 110A and device 110B (collectively, device(s) 110). Devices 110 can include a laptop computer, a desktop computer, a terminal, a mobile phone, a tablet computer, a smart watch, a wearable device, a personal digital assistant (PDA), a digital music player, a connected device, a speaker device, a server, and the like. Users 130 can be human users who interacts with device(s) 110. For example, user 130A can provide various inputs (e.g., via an input device/interface such as a keyboard, mouse, touchscreen, microphone, etc.) to device 110A. Device(s) 110 can also display, project, and/or otherwise provide content to user(s) 130 (e.g., via output components such as a screen, speaker, etc.).

As shown in FIG. 1, device(s) 110 can include applications such as transaction initiation application 116. Transaction initiation application 116 can be an application or module that configures/enables the device to initiate or execute various transactions (e.g., ecommerce transactions) and/or to provide content to, and/or otherwise perform operations on behalf of user 130. In certain implementations, transaction initiation application 116 can be a mobile application through which a user 130 can initiate an ecommerce transaction and/or obtain third-party services (e.g., financing) with respect to such a transaction. Transaction initiation application 116 can also initiate and/or perform various other operations, such as are described herein.

In certain implementations, transaction initiation application 116 can initiate or execute various operations in relation to various services 128. Such services 128 can be, for example, third-party services that can provide content and/or otherwise participate (directly or indirectly) in various aspects of the transactions described herein. For example, service 128A can be an ecommerce website that a user can interact with to initiate various transactions, purchases, etc. By way of further example, service 128B can be a financing service that a user can interact with (directly or indirectly) to obtain/receive various services (e.g., financing services) that support or facilitate a transaction initiated with respect to another service (e.g., an ecommerce purchase with service 128A). It should be understood that the referenced services are provided by way of example and that other services can be further integrated with respect to the described technologies. For example, other third-party services can provide information from external databases (e.g., public records, employment information, credit history, etc.) that the described technologies can utilize in performing various operations, such as those described herein. The manner in which such services (e.g., 128A and 128B) can be coordinated to facilitate a transaction initiated by user 130A can be managed by server 140, as described herein.

It should be noted that while various components (e.g., transaction initiation application 116) are depicted and/or described as operating on a device 110, this is only for the sake of clarity. However, in other implementations the referenced components can also be implemented on other devices/machines. For example, in lieu of executing locally at device 110, transaction initiation application 116 can be implemented remotely (e.g., on a server device or within a cloud service or framework). By way of illustration, transaction initiation application 116 can operate in conjunction with transaction facilitation engine 144 which can execute on a remote device (e.g., server 140, as described below). In doing so, transaction initiation application 116 can, for example, request or receive information, communications, etc., from transaction facilitation engine 144, thereby enhancing the functionality of transaction initiation application 116.

Figure 6:
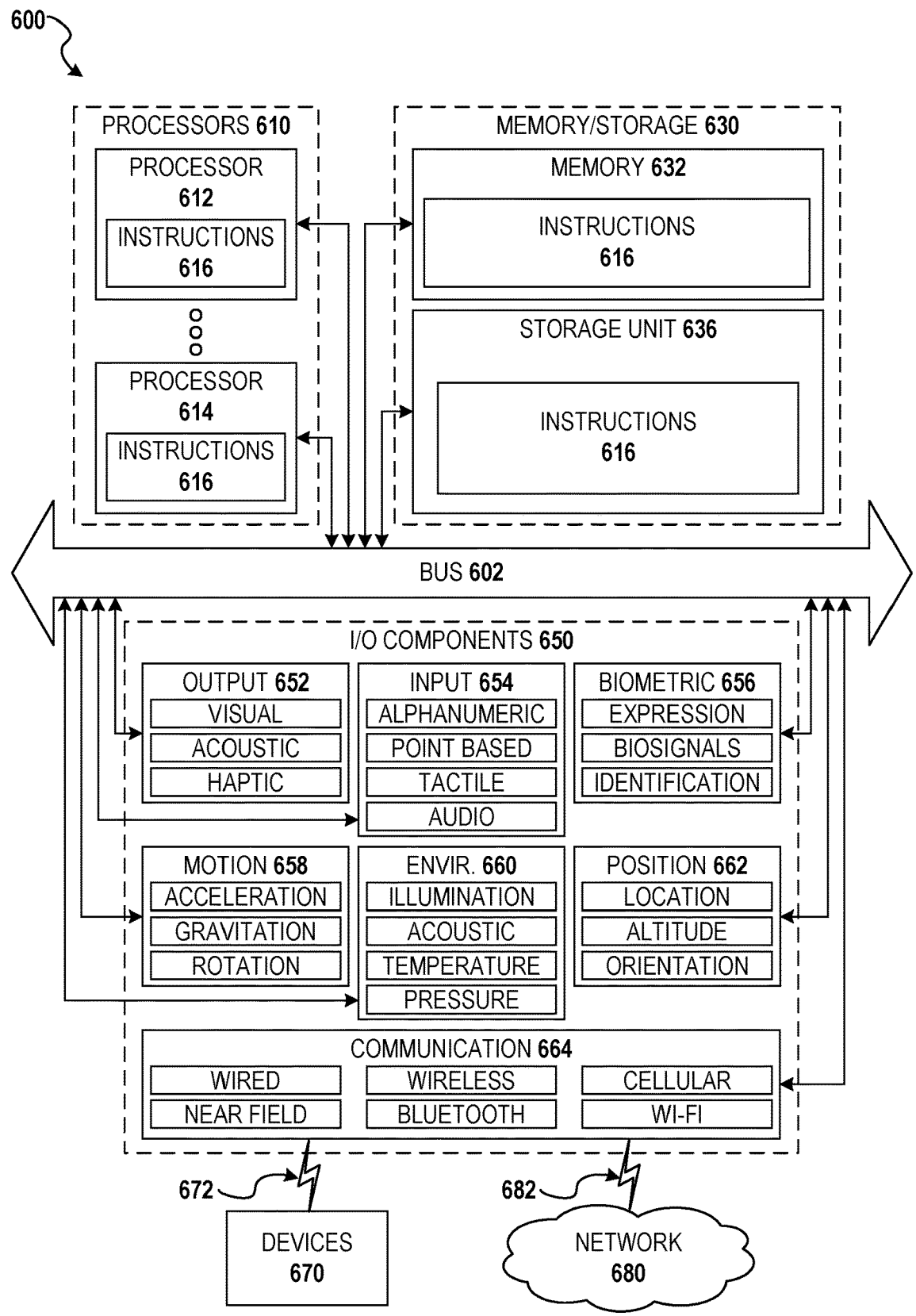
FIG. 6 is a block diagram illustrating components of a machine able to read instructions from a machine-readable medium and perform any of the methodologies discussed herein, according to an example embodiment.

The application(s) referenced above/herein (e.g., transaction initiation application 116) can be stored in memory of device 110 (e.g. memory 630 as depicted in FIG. 6 and described below). One or more processor(s) of device 110 (e.g., processors 710 as depicted in FIG. 6 and described below) can execute such application(s). In doing so, device 110 can be configured to perform various operations, present content to user 130, etc. Other examples of such applications include but are not limited to: social media/messaging applications, mobile 'apps,' etc.

As also shown in FIG. 1, device 110 can connect to and/or otherwise communicate with server 140 via network 120. Network 120 can include one or more networks such as the Internet, a wide area network (WAN), a local area network (LAN), a virtual private network (VPN), an intranet, and the like.

Server 140 can be, for example, a server computer, computing device, storage service (e.g., a 'cloud' service), etc., and can include transaction facilitation engine 144 and database 170.

Transaction facilitation engine 144 can be an application or module that configures/enables the server 140 to interact with, provide content to, and/or otherwise perform operations with respect to various users, devices, and/or services. In certain implementations, transaction facilitation engine 144 can be integrated and/or otherwise configured with respect to a service (e.g., service 128A, which may be an ecommerce website). User 130 can interact (via transaction initiation application 116A) with the referenced service 128A (e.g., to initiate an ecommerce purchase) and can further initiate a request to utilize additional service(s) (e.g., financing services) in relation to the transaction. Upon receiving such a request, server 140 and/or transaction facilitation engine 144 can coordinate the involvement of such additional service(s) with respect to the transaction (e.g., service 128B, which may be a financing service), as described herein.

In certain implementations, the manner in which transaction facilitation engine 144 coordinates or involves additional service(s) to facilitate a transaction can be directed, adjusted, and/or otherwise affected based on content retrieved from database 170. Database 170 can be a storage resource such as an object-oriented database, a relational database, etc. In other implementations, database 170 can be implemented within a distributed or decentralized system/environment (e.g., using blockchain and/or other distributed computing/storage technologies).

In certain implementations, various repositories such as content repository 160 can be defined and stored within database 170. Content repository 160 and/or database 170 can contain and/or reflect, for example, various logs, user histories, and/or other information associated with various users, services, transactions, etc. In certain implementations, such content can be utilized by transaction facilitation engine 144 to determine which service(s) to involve (or not involve) in facilitating a transaction. For example, a transaction associated with a user having a particular purchase history or pattern may be preferable with respect to one service provider but not another. By way of further example, a history of feedback, decisions, etc., provided by various services (e.g., to accept/reject a request to facilitate a transaction) can be used to project or predict whether a received request is/isn't likely to be accepted by a particular service (and to route such requests accordingly to improve or optimize the time until such a transaction can be facilitated/completed). Accordingly, the referenced content can be accounted for by transaction facilitation engine 144 in determining which service(s) to involve with respect to a particular transaction.

While many of the examples described herein are illustrated with respect to a single server 140, this is simply for the sake of clarity and brevity. However, it should be understood that the described technologies can also be implemented (in any number of configurations) across multiple servers and/or other computing devices/services.

Further aspects and features of server 140 and device(s) 110 and are described in more detail in conjunction with FIGS. 2-6, below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 2:
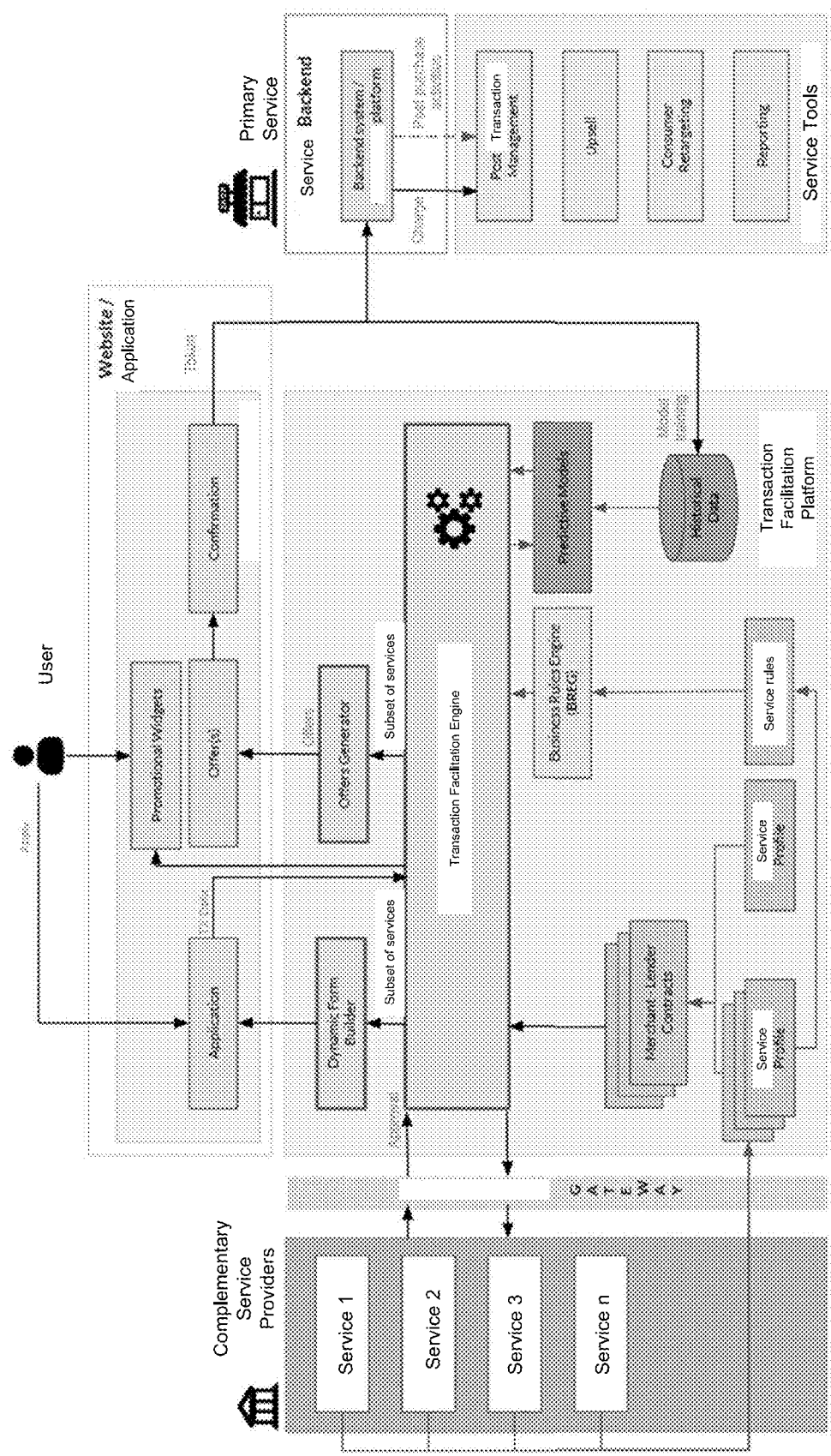
FIG. 2 illustrates further aspects of an example system, in accordance with an example embodiment.

Another example implementation of the described technologies 200 is depicted in FIG. 2. As shown in FIG. 2, a user can interact with a website, application, etc. (e.g., the described transaction initiation application 116), e.g., to initiate a transaction with a service (the depicted 'primary service,' which can be an ecommerce website, etc.). Such a service can be configured or integrated with the described transaction facilitation engine. In certain implementations, during the course of completing a transaction with the primary service (e.g., purchasing an item), the user can be provided with the option to utilize the described transaction facilitation engine. Upon receiving a selection/request from the user (e.g., to provide financing options for an ecommerce purchase), transaction facilitation engine can further interface with various complementary service providers, as shown.

In certain implementations, the transaction facilitation engine can prioritize various aspects of the described operations based on current and/or historical data, factors, and/or other factors, as described herein. Additionally, transaction facilitation engine can generate and/or provide various dynamic interface(s) that streamline the process by which the user can provide further information to prospective service providers, as described herein.

Figure 3:
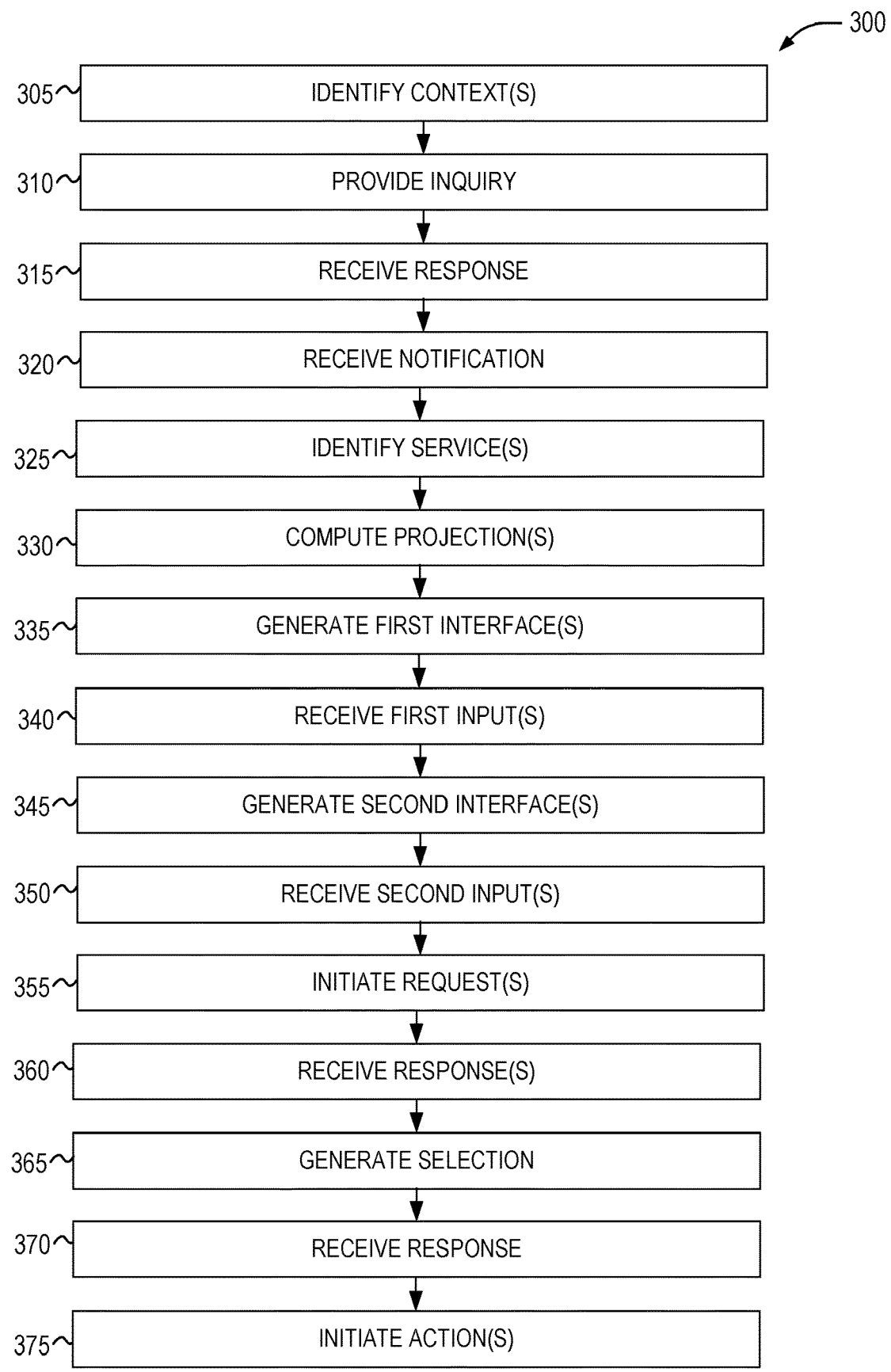
FIG. 3 is a flow chart illustrating a method, in accordance with an example embodiment, for cross-service transaction facilitation and dynamic transaction interfaces.

FIG. 3 is a flow chart illustrating a method 300, according to an example embodiment, for cross-service transaction facilitation and dynamic transaction interfaces. The method is performed by processing logic that can comprise hardware (circuitry, dedicated logic, etc.), software (such as is run on a computing device such as those described herein), or a combination of both. In one implementation, the method 300 can be performed by one or more elements depicted and/or described in relation to FIG. 1 and/or FIG. 2 (including but not limited to server 140 and/or transaction facilitation engine 144), while in some other implementations, the one or more operations can be performed by another machine or machines (e.g., device 110, service 128, etc.).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In certain implementations the described technologies can match a user wishing to complete a transaction with one service (e.g., an ecommerce transaction) to other complementary services (which may provide services, e.g., financing or other services) to facilitate completion of the referenced transaction. In certain implementations, the referenced matching can be performed in real-time (e.g., during the course of the purchase by the user) based on input parameters and/or configurations, as described herein. Additionally, in certain implementations the described technologies can utilize machine learning and artificial intelligence ('AI') techniques to improve/enhance various aspects of the described operations.

It can be appreciated that various primary service providers (e.g., an ecommerce platform) may provide a wide range of products/services to a wide range of users/customers. Moreover, other service providers may provide services which facilitate, complement, and/or enhance the referenced purchase (e.g., financing services, installation services, support services, warranty services, etc.). However, such complementary services providers may only be relevant to (or likely to approve) certain types of transactions (e.g., for certain categories of products, defined amounts, types of users, etc.).

Additionally, while multiple complementary service providers may potentially be relevant to a particular transaction, certain providers can be determined to be more likely than others to approve or facilitate a particular type of transaction. For example, based on a transaction history of previous transactions (and whether certain service providers approved/declined to facilitate such transactions), a likelihood that a service provider will approve facilitation (e.g., to provide financing or another complementary service) for a subsequent transaction can be projected. By way of illustration, upon determining that a particular service provider recently declined several transactions associated with electronics above a certain price threshold, such a provider can be de-prioritized (e.g., in favor of another provider) when a subsequent request (with corresponding parameters) is received. By way of further illustration, upon determining that a particular service provider recently approved several transactions associated with users exhibiting certain behavior patterns, such a provider can be prioritized when a subsequent request (with corresponding parameters) is received. Additionally, in certain implementations the referenced offers or services can be sorted or prioritized based on criteria such as the best APR for the user, maximum commission per transaction, merchant preferences, user history and preferences, probability user will accept the offer, and/or other factors, such as are described herein.

It should be noted that numerous factors can be accounted for in projecting a likelihood that a provider may facilitate a particular transaction. As noted, factors associated with such a transaction can be accounted for, including but not limited to details regarding the transaction. These parameters include, for example, transaction details such as purchase amount and currency, user details (e.g., credit history, occupation, employment information, housing ownership/rental status, etc.).

At operation 305, one or more contexts can be identified. In certain implementations, such contexts can be those within which a transaction facilitation inquiry can be provided or inserted. Such a transaction facilitation inquiry can include a prompt, notification, link or another interactive element that can notify a user of information (e.g., the availability of complementary services that may facilitate a transaction, such as a purchase of an item currently being presented) and enable the user to indicate interest in such a service. For example, various aspects of an interface of a website, application, etc. can be analyzed to identify areas, regions, etc., within which notification(s) can be provided to a user. Such notifications can, for example, inform the user that various services, such as financing or other complementary services, may be available (e.g., with respect to an item presented to the user on an ecommerce web site/webpage).

At operation 310, the transaction facilitation inquiry can be provided. In certain implementations such an inquiry (e.g., a prompt, notification, etc.) can be providing in relation to at least one of the identified one or more contexts (e.g., as identified at 305). For example, as described herein, upon identifying various contexts in which a user may be receptive or likely to be interested in certain service(s) (e.g., when viewing certain items at certain times under certain circumstances, etc.), a prompt, notification, etc., can be inserted or otherwise provided to the user. In doing so, the described technologies can notify the user of the availability of such services in scenarios in which the service(s) may be of particular relevance/interest to the user.

At operation 315, a response is received. In certain implementations, such a response can be a response to the transaction facilitation inquiry (e.g., as provided at 310). For example, a user can respond, select or otherwise interact with the referenced prompt, notification, etc., thereby indicating interest by the user of the referenced service(s) (e.g., financing/complementary services associated with the prompt, notification, etc.).

At operation 320, a notification is received. In certain implementations, such a notification can be received from a first service. Additionally, in certain implementations such a notification can include, correspond, or reference a first transaction, such as a transaction associated with a first user. By way of illustration, such a first service can be, for example, an ecommerce platform, website, etc., and the referenced notification can reflect that a user is interested in initiating a transaction (e.g., purchase an item) from the referenced platform, site, etc., as described herein.

In certain implementations, the referenced notification can be received, based on a response to the transaction facilitation inquiry (e.g., as received at 315). For example, as described herein, the user may be notified or prompted with an offer of such complementary service(s). Upon selecting such a prompt, the referenced notification of the first transaction associated with the first user can be generated/provided (e.g., by the first service) and received (e.g., by server 140 and/or transaction facilitation engine 144), as described herein.

At operation 325, one or more second services can be identified. In certain implementations, such second service(s) can be those configured to facilitate execution of the first transaction (e.g., the transaction with respect to which the notification at 320 is associated). For example, as described in detail herein, various financing or other such complementary services can be identified with respect to a first transaction (e.g., a prospective ecommerce purchase).

At operation 330, one or more transaction execution projections are computed. In certain implementations, such transaction execution projections can be computed with respect to at least one of the one or more second services. In certain implementations, such transaction execution projections can include or reflect the likelihood that a particular transaction is likely to be facilitated by a particular service. For example, such a transaction execution projection can include or reflect that one service may be likely to offer financing pursuant to a particular set of terms to a particular user for a particular purchase while another services may be relatively less likely to make such an offer (or may make another offer pursuant to a different set of terms). Additionally, in certain implementations the referenced transaction execution projections can be computed based on the projected likelihood that the user is to accept such an offer (e.g., on account of various terms, other factors, etc., as described herein).

In certain implementations, the referenced transaction execution projections can be computed based on various factors, information, etc., as described herein. Among the factors that such transaction execution projections can be computed based on include actions initiated by the first user. For example, the user's interactions with an ecommerce website, application, etc., can be accounted for in determining the likelihood a service (e.g., a financing service) is to make an offer for service to the user. Additionally, in certain implementations actions initiated by a second user, such as other user's interactions with an ecommerce website, application, etc., can be accounted for in determining the likelihood a service (e.g., a financing service) is to make an offer for service to the first user (e.g., based on various identified similarities between the users). Additionally, in certain implementations a response to a transaction facilitation request previously provided by at least one of the one or more second services (e.g., prior offers such services have provided) can be accounted for in determining the likelihood a service (e.g., a financing service) is to make an offer for service to the first user. By way of further example, transaction execution selection response(s) previously provided by the first user (e.g., prior selections or decisions provided by the user with respect to previous service offers) can be accounted for in determining a likelihood the user is to accept a particular offer. Additionally, in certain implementations transaction execution selection response(s) previously provided by other users (e.g., prior selections or decisions provided by other users with respect to previous service offers) can be accounted for in determining a likelihood the current user is to accept a particular offer. It should be understood that the referenced examples are non-limiting and that any number of other factors can also be accounted for, as described herein.

At operation 335, a first interface is generated. In certain implementations, such an interface can be generated based on the identified one or more second services (e.g., as identified at 325) and the one or more transaction execution projections (e.g., as computed at 330). In certain implementations, such a interface can include a first graphical user interface. Additionally, in certain implementations, the interface can include or incorporate various forms (e.g., those through which the user can provide inputs, e.g., text/numeric inputs) and/or selectable controls, such as are described herein. Additionally, in certain implementations various aspects of the referenced interface can be adapted, optimized, adjusted, etc. based on the user's device, location, language, preferences, etc., as described herein.

In certain implementations, the referenced first interface can be generated based on various factors. For example, in certain implementations the referenced interface can be generated based on one or more actions initiated by the first user (e.g., the manner in which the user browses a website, interacts with an application, etc.) which can indicate various arrangements or sequences that may be advantageous in presenting certain forms, etc., which correspond to information to be provided by/collected from the user in order to facilitate the computation of decisions by the referenced services with respect to whether such services are to make offers (e.g., a financing offer) so such a user, as well as the terms of such an offer. Additionally, in certain implementations the referenced interface can be generated based on one or more actions initiated by a second user (e.g., a user determined to be similar to the current user). In certain implementations the referenced interface can be generated based on a response to a transaction facilitation request previously provided by at least one of the one or more second services. For example, upon determining that a certain service did not offer service to the current user (or to similar users in similar circumstances), forms, etc., that may be particular to such a service can be deprioritized (e.g., moved later in a sequence of forms presented to a user). In doing so, the interface can prompt the user to provide information most likely to be relevant in facilitating an offer that is both likely to be made by the service and likely to be accepted by the user.

By way of further illustration, in certain implementations the described technologies can further monitor and account for various user interaction information in projecting a likelihood that a provider may facilitate a particular transaction. Such interaction information can include the time it takes to complete an application and the user's browsing behavior, patterns, etc. before or during an application submission. In certain implementations, historical information can be further accounted for (e.g., using machine learning techniques) in computing the referenced projection. By way of illustration, users that spend a certain amount of time researching a product (e.g., more than 10 minutes navigating an ecommerce website) may be determined to be more likely to accept a financing offer. Accordingly, upon determining that a particular user exhibited such behavior, certain service providers may be more likely to offer complementary services (e.g., financing) to such a user.

By way of further illustration, navigating across a wide range of high cost items in a short time may be determined to be more likely to be fraudulent activity. Accordingly, upon determining that a particular user exhibited such behavior, certain service providers may be less likely to offer complementary services (e.g., financing) to such a transaction. Accordingly, the described technologies (including the referenced transaction facilitation engine) can interact with and generate an optimized list of complementary service providers, e.g., for the specific user with respect to a specific transaction.

It should be noted that the referenced details/parameters can be collected in a single instance/interface or at multiple intervals/across several requests (e.g., to maintain user engagement).

By way of further example a user can initiate a transaction via a primary service provider (e.g., an ecommerce website) with respect to an item (e.g., a camera for $4,000). During the course of financializing such a transaction, the user can be presented with the option to solicit offers from complementary services (e.g., third party services to finance, warranty, support, etc., the transaction/item).

The referenced transaction facilitation engine can receive various parameters, such as the country of the user (e.g., 'US'), the industry associated with the transaction ('consumer electronics'), a risk profile associated with the user (low'), transaction details (e.g., amount=4,000, currency=USD, product type=camera and quantity=1) and user details (e.g., name, address, phone etc.). Based on the referenced information, certain complementary service providers can be filtered/eliminated (e.g., because such providers do not support transactions having the referenced parameters, e.g., users located in the referenced country, etc.).

In certain implementations, various factors can be accounted for in filtering out various services. For example, system factors: such as inactive services; services configuration: services that are not working with a particular location, services that blacklisted the primary service, services that don't work with the merchant's industry, services that don't support the borrowers location (relevant for identified returning shoppers, where the shopper location is known before filling the application form), services that don't support the user's location (relevant for identified returning shoppers, where the shopper location is known before filling the application form), services that do not support the borrowers risk profile (relevant if the borrower already filled an application recently); services that can't support settlement in the currency that can be converted to the merchant's desired settlement currency; merchant configuration: service that the merchant blacklisted; transaction factors: services that don't support the transaction amount; services that do not support subsidizing (it relevant). In subsequent rounds of filtering, services can be filtered based on regulations not supporting the user's location, not supporting user's risk profile, not supporting the transaction risk profile, etc.

Additionally, as described herein, various behavioral and/or historical information can be accounted for in determining which services are most like to provide offers to the user (e.g., with respect to a given transaction), which service providers to prioritize, which service offers are most likely to be accepted by the user, etc.

For example, as noted, the user's behavioral information (e.g., the user's historical interactions with other services and previous decisions with respect to which service offers have been accepted and which offers have been declined by the user). Historical behavior information from other similar users that have worked with these service providers or similar providers in the past can also be accounted for. Based on this information, the described technologies can filter out irrelevant service providers while maintaining a subset of providers best suited for a given transaction.

Having identified the complementary service providers best suited for a given transaction, a dynamic transaction interface can be generated. Such an interface can include various forms or selectable controls (e.g., radio buttons, check boxes, etc.) within which the user can input information (to be provided to the various service providers). Such forms, controls, etc., can be dynamically arranged based on the service providers determined to be relevant and/or most likely to provide complementary services with respect to the transaction, as described herein.

Upon receiving inputs from the user in response/with respect to the referenced dynamically generated transaction interface, such inputs together with historical details from this user and similar users can be analyzed by the transaction facilitation engine. In doing so, various service providers can be further determined to be most likely to approve a request with respect to the referenced transaction. Those providers with the highest likelihood of acceptance (and/or most likely to be accepted by the user) can be contacted first (contact with other providers can be initiated subsequently), e.g., in order to maximize approval rate and present the best/optimal options.

At operation 340, one or more first inputs are received. In certain implementations, such inputs are received with respect to the first interface. For example, the user can provide various information into different fields, selectable controls, etc. Such information can include personal information, employment information, financial information, etc., as described herein.

At operation 345, a second interface is generated. In certain implementations, such a second interface is generated based on the received one or more first inputs (e.g., as received at 340). Additionally, in certain implementations, such a second interface is generated based on the identified one or more second services (e.g., as identified at 325). Moreover, in certain implementations such a second interface is generated based on one or more transaction execution projections (e.g., as computed at 330).

Additionally, in certain implementations, one or more second transaction execution projections can be computed with respect to at least one of the one or more second services. In certain implementations such second transaction execution projections can be computed based on the received one or more first inputs (e.g., as received at 340). Additionally, in certain implementations the second interface can be generated further based on computed second transaction execution projections. For example, upon receiving various inputs to a first form or set of forms, the described technologies can compute or project the likelihood a particular service will make an offer, the terms of the offer, the likelihood the user is to accept it, etc. Accordingly, as the user provides additional information, such projections can be computed and re-computed (e.g., continuously, in real time, etc.) to identify service(s) that may provide offers most likely to result in a completed transaction. The referenced interfaces can be dynamically adjusted accordingly to account for such changes (e.g., by changing a sequence in which certain information is collected, to account for such changes in likelihood).

At operation 350, one or more second inputs are received. In certain implementations, such inputs are received with respect to the second interface (e. g., as generated at 345) as described herein.

By way of further illustration, in certain implementations, the referenced dynamic transaction interface can improve or optimize the user experience in an application form. Doing so enables the described technologies to connect a single user to multiple service providers to facilitate a transaction with respect to another service. Each respective service provider may have a different set of fields the user is to complete. The described dynamic transaction interface can generate an optimized form based on a list or group of service providers determined to be relevant for a given transaction.

In certain implementations, the application form can optimize the number of fields to be filled out by the user and optimizes the form layout/interface. In doing so, the user's experience in completing the form and/or interacting with the interface can be improved. For example, easier forms with short completion times have higher conversion rates and fewer users abandon the form before completing it.

Figure 4:
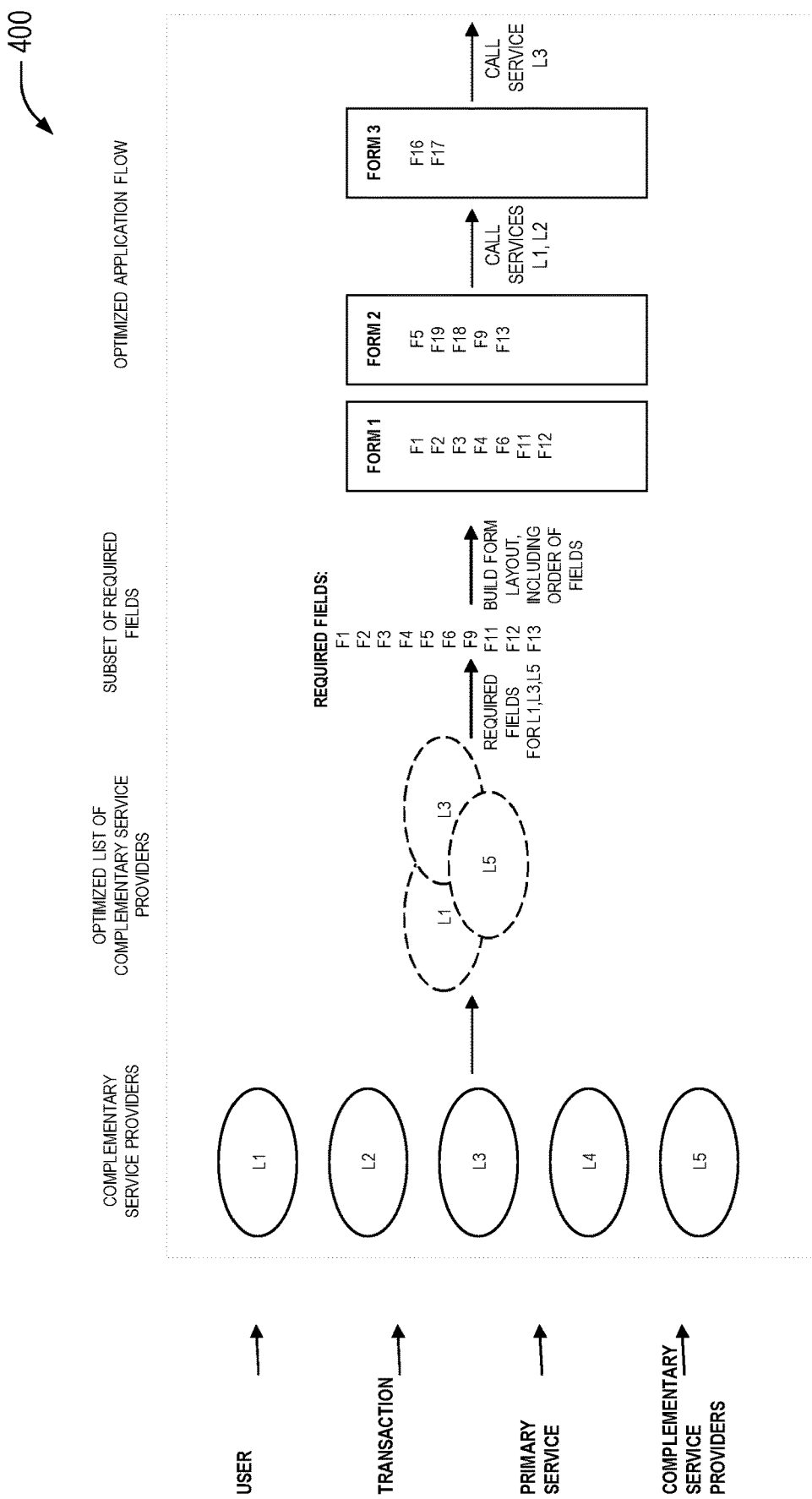
FIG. 4 depicts an example scenario described herein, in accordance with an example embodiment.

Further aspects of the referenced dynamic transaction interface(s) are shown in FIG. 4. As shown in scenario 400 as depicted in FIG. 4, the described technologies can account for various parameters and/or other information in defining aspects of interface(s) to be generated and/or presented to the user. In certain implementations, such interfaces can be configured or adapted to minimize the number of interactions/inputs to be provided by the user, and/or to otherwise increase the likelihood the user will complete the reference forms.

By way of further illustration, in certain implementations the referenced dynamic transaction interface(s) can be configured to be optimized for certain values. For example, a list of options or fields that are relevant/necessary for multiple service providers can be consolidated into a single form/interface. For example, while different providers may support different options for marital status, such options can be consolidated into a single interface. In doing so, the described technologies can define the set of available options for a particular set or combination of service providers.

By way of further illustration, in certain implementations the layout and/or sequencing of the referenced dynamic transaction interface(s) can be configured to be optimized, e.g., based on various criteria. For example, such interface(s) can be configured to start with non-sensitive information and then prompt/collect difficult or complex questions later (e.g., after the user is engaged in the process). Machine learning techniques can be further utilized to enhance or improve the described interface(s), e.g., based on real-time or historical feedback.

For example: utilizing the described technologies, a user 'C1' can initiate a transaction (e.g., an ecommerce purchase of a $4,000 camera) with service M1. During the course of finalizing/completing the transaction (e.g., during a checkout process/sequence), the user can solicit complementary service offers (e.g., financing offers, etc., from third party services). The described technologies (including the referenced transaction facilitation engine) can processes various input parameters from the transaction and the user, further account for various system configuration(s), and select a subset of complementary service providers (e.g., as shown in FIG. 4 and described herein).

As noted, different complementary service providers (e.g., financing services) may maintain different sets of fields, inputs, controls, etc., that correspond to information that such providers are to receive from a user (e.g., to determine whether to provide an offer of services to such a user, e.g., with respect to a particular transaction). It can be appreciated that certain fields may be common across providers, others may be comparable/similar, and yet others may be different. For example, some providers may require 'Gender' for a service decision, while others don't. Accordingly, the described technologies can dynamically generate interface(s) that account for such requirements. In doing so, a user can be prompted with the minimum number fields needed to enable the identified providers to obtain the information they need. It can be further appreciated that a user's input with respect to one field can impact or adjust aspects of the referenced interface. For example, upon receiving an input that eliminates a service provider from providing services with respect to a particular transaction (e.g., upon receiving an input that a user is not employed, and a service provider does not provide financing services to users who are not presently employed), further aspects of the referenced interface can be adjusted to reflect the elimination of the referenced provider (e.g., fields previously included on account of such a provider can be removed).

Moreover, as noted, various service providers may have different sets of values for similar multi-value fields. For example: various service providers may request 'Employment Status' in determining whether to provide various services. However, some providers may have 'Student' as an option while other don't. Accordingly, the described technologies can dynamically generate a list of selectable values/options based on the specific user, transaction, and set of service provider(s).

The described technologies can also select fields to include in the initial application request and which to collect at a later stage, e.g., based on the primary service provider's waterfall configuration. For example, in relation to the scenario depicted in FIG. 4, if complementary service provider L5 requires specific field F1 but the transaction facilitation engine calls L1 first, then L3 and only if there is no offer from both, it calls L5, the dynamic interface can be configured such that the user may not be prompted for F1 during the initial application but only later if the user doesn't get an offer from L1 or L3.

The dynamic interface can be continuously adjusted/optimized based on various factors. For example, the layout of the interfaces, forms, the order of the fields, etc., can be adjusted for a particular user with respect to each respective transaction, e.g., using machine learning techniques with respect to the user's historical purchases and using data from other users/transactions.

At operation 355, one or more transaction facilitation requests are initiated. In certain implementations, such transaction facilitation requests can be initiated based on the one or more first inputs (e.g., as received at 340) and the one or more second inputs (e.g., as received at 350). Such transaction facilitation requests can be, for example, transmissions or notifications provided to various services, which include and incorporate various parameters or information pertaining to the user, the prospective transaction, information provided by the user via the referenced interfaces, etc., and which can further request whether the service will provide an offer (e.g., for financing or other complementary service) (together with the terms of such offer) to facilitate execution of the transaction.

At operation 360, one or more responses are received. In certain implementations, such responses can be responses provided by at least one of the one or more second services to the one or more transaction facilitation requests (e.g., as initiated at 355). For example, such responses can include an indication or confirmation a particular service will provide an offer (e.g., for financing or other complementary service) (together with the terms of such offer) to facilitate execution of the transaction.

At operation 365, a transaction execution selection is generated. In certain implementations such a transaction execution selection can be generated based on the received one or more responses (e.g., as received at 360). In certain implementations such a transaction execution selection can be a notification or prompt presented to the user, reflecting various aspects of the referenced offers or other such service options, and enabling the user to agree or select such a service through which to complete, finalize, execute, etc., the referenced transaction. As described in detail herein, in certain implementations the referenced transaction execution selection can include or reflect a generated composite transaction execution selection. For example, several offers can be combined or aggregated to facilitate a single transaction (e.g., purchase).

At operation 370, a transaction execution selection response is received. For example, the user can select or confirm that a particular service is acceptable and that the transaction should be finalized via the selected service(s).

At operation 375, one or more actions are initiated. In certain implementations, such actions are initiated with respect to the first transaction (e.g., the transaction associated with the first service as referenced at 320, such as an ecommerce purchase from an ecommerce platform). Additionally, in certain implementations such actions are initiated based on the received transaction execution selection response (e.g., as received at 370). Moreover, in certain implementations execution of the first transaction can be completed in relation to at least one of the received one or more responses (as received at 360) and the received transaction execution selection response (as received at 370), as described herein.

Moreover, in certain implementations the described technologies can be configured to combine, consolidate, and/or otherwise associate services provided by multiple service providers. For example, in certain implementations multiple financing offers can be consolidated (with respect to the user) into a single, simple offer and a single signup form. Doing so can maximize approval rate and minimizes various costs by instantly generating a personalized offer (with respect to the user/transaction) that combines multiple options into a single offer.

By way of illustration, user C1 wishes to buy a camera from service M1 for $4,000. Currently, a user that applies for financing may not get an offer at all because no service provider can finance the entire purchase amount. For example, service provider 1—No Approval, service provider 2—Approval for $2,500 at 6.5% APR up to 12 installments, service provider 3—Approval for $2,000 at 9% APR up to 24 installments, service provider 4—Approval for $3,000 at 16% APR, open line of credit, service provider 5—Approval for $1,000 at 8% APR at 6 installments. Accordingly, by combining the referenced offers, a personalized multi-service offer can be generated and presented to C1. Such a $4,000 optimized offer can have the following parameters: $2,500 for 6.5% APR, 6 installments from L2, $1,000 for 8% APR, 6 installments from L5, $500 for 9% APR, 6 installments from L3. By generating/providing the referenced service offers (from multiple providers) into a compound service offer, the user can increase their options to receive services even in scenarios in which a single service provider may be unable to provide a particular service (e.g., with respect to an entire transaction).

In certain implementations, such a compound service offer can combine financing with other transaction completion methods (e.g., 'pay now'). Additionally, in certain implementations the described technologies can be configured to enable down payment, e.g., if the approval amount is less than the basket total (e.g., instead of a decline). This flexibility can further increase approval rates.

In generating a compound offer, various criteria can be accounted for, including but not limited to: ability to combine offers with other services, type of users, type of services, offers, etc., optimization techniques (optimize for: conversion, cost, approval rates etc.), user data, historical user behavior, user preference, etc.

Figure 5:
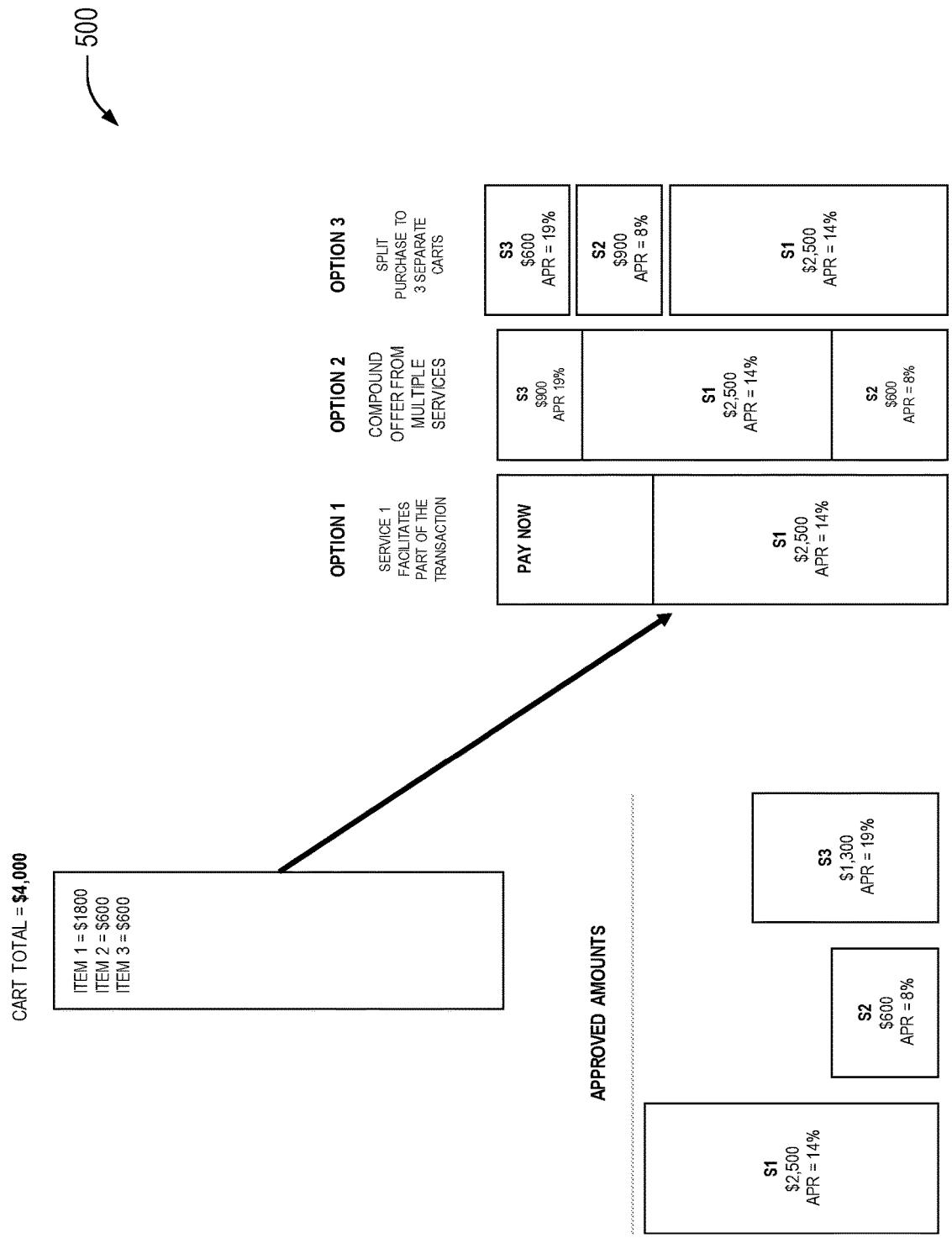
FIG. 5 depicts an example scenario described herein, in accordance with an example embodiment.

By way of illustration, as shown in scenario 500 as depicted in FIG. 5, user C1 can initiate a transaction with respect to a coffee machine, a TV and a tablet device for $4,000 in total. Using the described technologies, various service providers can reply with partial approvals. The described technologies can then aggregate/combine the received offers and present such options to the user. Doing so can further enable multiple services to be combined with other transaction completion options (e.g., a 'pay now' option) or propose to split the transaction into multiple (smaller) transactions.

Additionally, in certain implementations the described dynamic transaction interfaces can be further utilized to enable a user to provide information or activate multiple services (including in a consolidated offer) using a single/unified interface/process. The user can review and execute various corresponding agreements for the respective service providers within the referenced dynamic interface(s).

The described technologies can further enable various aspects of a primary service provider (e.g., an ecommerce application, website, platform, etc.) to be dynamically adjusted, configured, etc. For example, the described technologies can include a personalization module that can determine (e.g., in real time) a relevant/optimal context with respect to which complementary service options are to be presented to a user (e.g., on a product page, only at checkout, etc.). Such configurations can be governed by various preferences, heuristics that are based on historic data processing, etc.

By way of further illustration, the described technologies can further account for criteria like consumer preferences, historical behavior, etc. in providing various complementary services with respect to a transaction. For example, using machine learning techniques, if a user browses for similar products but less expensive first and then checks more expensive product, the personalization module would take the shopping pattern into consideration to decide how to present an appealing service offering to the customer based on her browsing pattern, the product (type of product), the vertical, etc. (e.g., based on previously successful offers provided in scenarios with comparable parameters).

In certain implementations, the referenced personalization service can use machine learning techniques that includes, among other considerations, the following: type of service offers this customer liked in the past, historical offers with this merchant or with different merchants, type of service offers similar users liked, users with similar behavioral pattern or with similar demographic characteristics, type of service offers that users who have purchased similar types of products liked, preferred type of offers for users that have purchased items at a similar price, available offers by service that works with this provider, etc. The described technologies can take the referenced information into consideration, and generate personalized/optimized service options for this product and customer combination. Such a personalized offer is more relevant and increases the chances the user will proceed to checkout and complete the transaction.

By way of illustration: user C1 is interested in buying a Camera for $3500 from service M1. User C1 has previously purchased with financing both from this Merchant and other Merchants. Usually the consumer chooses a 6-12 months installment plan at an APR ranging from 14.99% to 19.99%. Also, the user previously declined past financial offers with a 24.99% APR. Based on behavioral and demographic analysis, the described technologies can determine that similar users usually choose financing offers ranging from 3 to 12 installments with an APR of 9.99% to 24.99%. Based on historical data, users that purchased similar types of products usually chose a 12-month installment plan. Accordingly, the described technologies can generate and provide a financing offer of a 12-month installment plan with 19.99% APR, which is the best offer for this consumer for this purchase.

It should also be noted that while the technologies described herein are illustrated primarily with respect to cross-service transaction facilitation and dynamic transaction interfaces, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a processor or other programmable processor. Once configured by such software, hardware modules become specific machines (or specific components of a machine) uniquely tailored to perform the configured functions. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a processor configured by software to become a special-purpose processor, the processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-5 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 6 is a block diagram illustrating components of a machine 600, according to some example implementations, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein can be executed. The instructions 616 transform the machine into a particular machine programmed to carry out the described and illustrated functions in the manner described. In alternative implementations, the machine 600 operates as a standalone device or can be coupled (e.g., networked) to other machines. In a networked deployment, the machine 600 can operate in the capacity of a server machine or a client machine in a server-client network environment, or as a peer machine in a peer-to-peer (or distributed) network environment. The machine 600 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 can include processors 610, memory/storage 630, and I/O components 650, which can be configured to communicate with each other such as via a bus 602. In an example implementation, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 612 and a processor 614 that can execute the instructions 616. The term "processor" is intended to include multi-core processors that can comprise two or more independent processors (sometimes referred to as "cores") that can execute instructions contemporaneously. Although FIG. 6 shows multiple processors 610, the machine 600 can include a single processor with a single core, a single processor with multiple cores (e.g., a multi-core processor), multiple processors with a single core, multiple processors with multiples cores, or any combination thereof.

The memory/storage 630 can include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 can also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, "machine-readable medium" means a device able to store instructions (e.g., instructions 616) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine (e.g., processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 can include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 can include many other components that are not shown in FIG. 6. The I/O components 650 are grouped according to functionality merely for simplifying the following discussion and the grouping is in no way limiting. In various example implementations, the I/O components 650 can include output components 652 and input components 654. The output components 652 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 650 can include biometric components 656, motion components 658, environmental components 660, or position components 662, among a wide array of other components. For example, the biometric components 656 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 can include acceleration sensor components (e.g., accelerometer), gravitation sensor components, rotation sensor components (e.g., gyroscope), and so forth. The environmental components 660 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 662 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 650 can include communication components 664 operable to couple the machine 600 to a network 680 or devices 670 via a coupling 682 and a coupling 672, respectively. For example, the communication components 664 can include a network interface component or other suitable device to interface with the network 680. In further examples, the communication components 664 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 can be another machine or any of a wide variety of peripheral devices (e.g., a peripheral device coupled via a USB).

Moreover, the communication components 664 can detect identifiers or include components operable to detect identifiers. For example, the communication components 664 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 664, such as location via Internet Protocol (IP) geolocation, location via Wi-Fi® signal triangulation, location via detecting an NFC beacon signal that can indicate a particular location, and so forth.

In various example implementations, one or more portions of the network 680 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 can include a wireless or cellular network and the coupling 682 can be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 616 can be transmitted or received over the network 680 using a transmission medium via a network interface device (e.g., a network interface component included in the communication components 664) and utilizing any one of a number of well-known transfer protocols (e.g., HTTP). Similarly, the instructions 616 can be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
a server in communication with a first service, one or more second services, and at least one user device, the server comprising:
a processing device; and
a memory coupled to the processing device and storing instructions that, when executed by the processing device, cause the system to perform operations comprising:
receiving, from the first service, a notification of a first transaction associated with a first user;
identifying the one or more second services configured to facilitate execution of the first transaction;
computing, by the server, one or more transaction execution projections with respect to at least one of the one or more identified second services based on a likelihood that the first transaction, as received from the first service, will be facilitated by the at least one of the one or more second services;
dynamically generating a first interface based on the identified one or more second services and the one or more transaction execution projections, wherein the generated first interface includes one or more selectable controls through which a user can provide one or more inputs with respect to the identified one or more second services;
receiving, from the at least one user device, one or more first inputs with respect to the dynamically generated first interface;
generating a second interface based on the one or more first inputs as received from the at least one user device, the identified one or more second services, and the one or more transaction execution projections as computed by the server;
receiving, from the at least one user device, one or more second inputs with respect to the second interface;
initiating one or more transaction facilitation requests based on the one or more first inputs and the one or more second inputs;
receiving, from the at least one user device, one or more responses to the one or more transaction facilitation requests from at least one of the one or more second services;
generating a transaction execution selection based on the received one or more responses;
receiving, from the at least one user device, a transaction execution selection response; and
initiating one or more actions with respect to the first transaction based on the received.

2. The system of claim 1, further comprising:
identifying one or more contexts within which to provide a transaction facilitation inquiry; and
providing the transaction facilitation inquiry in relation to at least one of the identified one or more contexts.

3. The system of claim 2, further comprising receiving a response to the transaction facilitation inquiry.

4. The system of claim 3, wherein receiving a notification of a first transaction comprises receiving, based on the response to the transaction facilitation inquiry, the notification of the first transaction associated with the first user.

5. The system of claim 1, wherein computing one or more transaction execution projections comprises computing one or more transaction execution projections based on one or more actions initiated by the first user.

6. The system of claim 1, wherein computing one or more transaction execution projections comprises computing one or more transaction execution projections based on one or more actions initiated by a second user.

7. The system of claim 1, wherein computing one or more transaction execution projections comprises computing one or more transaction execution projections based on a response to a transaction facilitation request previously provided by at least one of the one or more second services.

8. The system of claim 1, wherein computing one or more transaction execution projections comprises computing one or more transaction execution projections based on a transaction execution selection response previously provided by the first user.

9. The system of claim 1, wherein computing one or more transaction execution projections comprises computing one or more transaction execution projections based on a transaction execution selection response previously provided by a second user.

10. The system of claim 1, wherein generating a first interface comprises generating a first graphical user interface.

11. The system of claim 10, wherein the first graphical user interface comprises one or more selectable controls.

12. The system of claim 1, wherein generating a first interface comprises generating the first interface based on one or more actions initiated by the first user.

13. The system of claim 1, wherein generating a first interface comprises generating the first interface based on one or more actions initiated by a second user.

14. The system of claim 1, wherein generating a first interface comprises generating the first interface further based on a response to a transaction facilitation request previously provided by at least one of the one or more second services.

15. The system of claim 1, wherein generating a second interface comprises computing, based on the received one or more first inputs, one or more second transaction execution projections with respect to at least one of the one or more second services.

16. The system of claim 15, wherein generating a second interface comprises generating the second interface further based on the computed one or more second transaction execution projections.

17. The system of claim 1, wherein generating a transaction execution selection comprises generating a composite transaction execution selection.

18. The system of claim 1, wherein initiating one or more actions comprises completing execution of the first transaction in relation to at least one of the received one or more response and the received transaction execution selection response.

19. A method comprising:
receiving, from a first service, a notification of a first transaction associated with a first user;
identifying one or more second services configured to facilitate execution of the first transaction;
computing, by a server, one or more transaction execution projections with respect to at least one of the one or more identified second services based on a likelihood that the first transaction, as received from the first service, will be facilitated by the at least one of the one or more second services;
dynamically generating a first interface, by the server, based on the identified one or more second services and the one or more transaction execution projections, wherein the generated first interface includes one or more selectable controls through which a user can provide one or more inputs with respect to the identified one or more second services;
receiving, from at least one user device, one or more first inputs with respect to the dynamically generated first interface;
generating, a second interface based on the one or more first inputs as received from the at least one user device, the identified one or more second services, and the one or more transaction execution projections as computed by the server;
receiving, one or more second inputs with respect to the second interface;
initiating, one or more transaction facilitation requests based on the one or more first inputs and the one or more second inputs;
receiving, one or more responses to the one or more transaction facilitation requests from at least one of the one or more second services;
generating, a transaction execution selection based on the received one or more responses;
receiving, a transaction execution selection response; and
initiating one or more actions with respect to the first transaction based on the received.

20. A non-transitory computer readable medium having instructions stored thereon that, when executed by a processing device, cause the processing device to perform operations comprising:
receiving, from a first service, a notification of a first transaction associated with a first user;
identifying one or more second services configured to facilitate execution of the first transaction;
computing one or more transaction execution projections with respect to at least one of the one or more identified second services based on a likelihood that the first transaction, as received from the first service, will be facilitated by the at least one of the one or more second services;
dynamically generating a first interface based on the identified one or more second services and the one or more transaction execution projections, wherein the generated first interface includes one or more selectable controls through which a user can provide one or more inputs with respect to the identified one or more second services;
receiving, one or more first inputs with respect to the dynamically generated first interface;
generating a second interface based on the received one or more first inputs, the identified one or more second services, and the one or more transaction execution projections;
receiving one or more second inputs with respect to the second interface;
initiating one or more transaction facilitation requests based on the one or more first inputs and the one or more second inputs;
receiving one or more responses to the one or more transaction facilitation requests from at least one of the one or more second services;
generating a transaction execution selection based on the received one or more responses;
receiving a transaction execution selection response; and
initiating one or more actions with respect to the first transaction based on the received.

* * * * *